D. Whisler,
Ditching Plow,
No. 2,923, Reissued May 5, 1868.
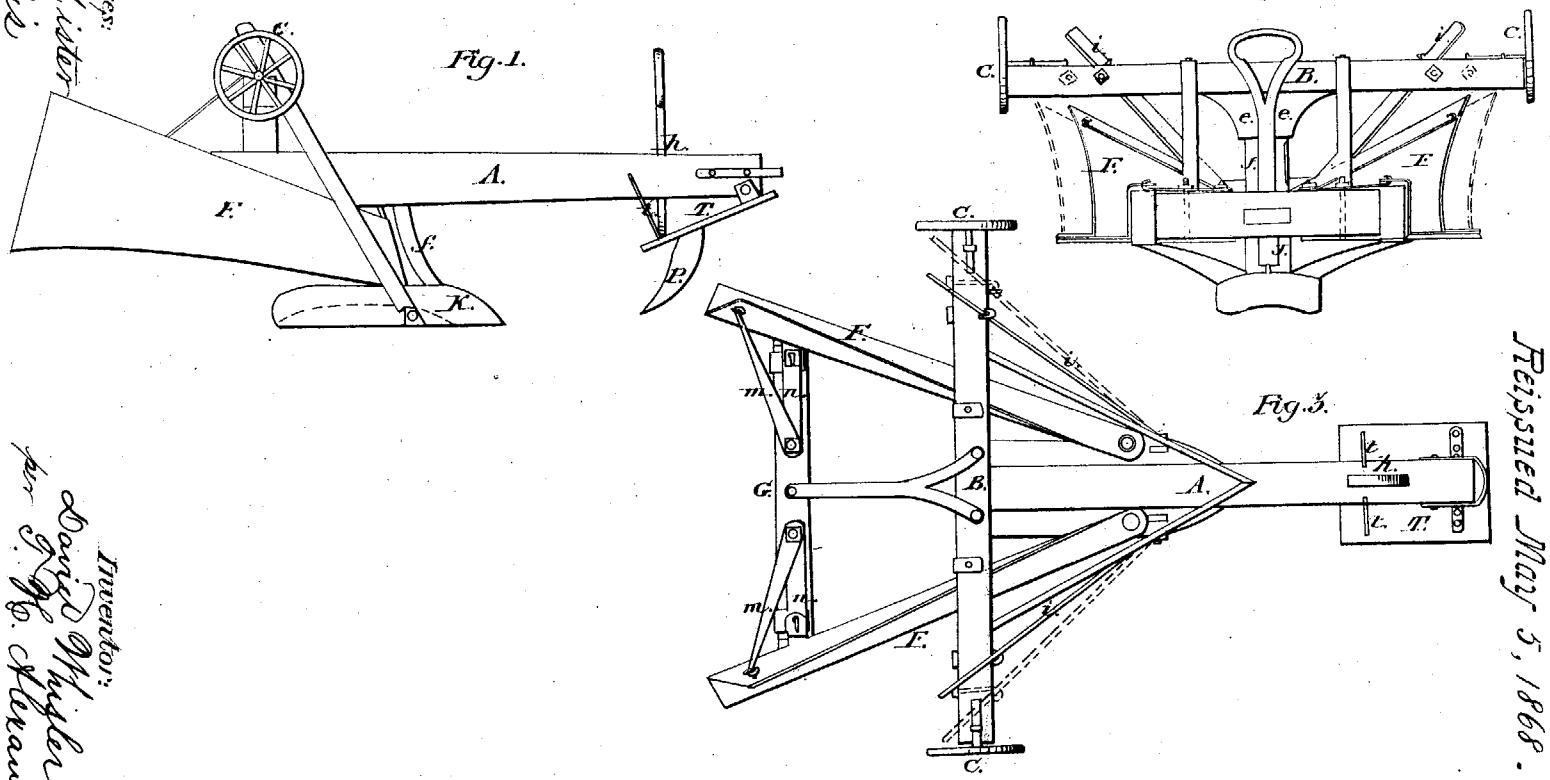
Witnesses:
J. W. Mister
Jno. A. Ellis
Inventor:
David Whisler
per T. H. Alexander
Attorney.
N. PETERS, PHOTO-LITHOGRAPHER, WASHINGTON, D. C.

UNITED STATES PATENT OFFICE.

DAVID WHISLER, OF UNION TOWNSHIP, OHIO.

IMPROVEMENT IN DITCHING-MACHINE.

Specification forming part of Letters Patent No. 72,953, dated December3 1, 1867; Reissue No. 2,923, dated May 5, 1868.

*To all whom it may concern:*

Be it known that I, DAVID WHISLER, of Union township, in the county of Hancock and State of Ohio, have invented a new and useful Improvement in Ditching-Plows; and I do hereby declare the following to be a full, clear, and exact description of the same, reference being had to the accompanying drawings, and to the letters of reference marked thereon, and in which—

Figure 1 represents a side elevation, Fig. 2 a rear view, and Fig. 3 a plan view, of my plow.

To enable others skilled in the art to make and use my invention, I will now describe its construction and operation.

A designates a beam, and B a cross-bar, to which the axles of wheels C C are attached by means of staples. The cross-bar B is supported by the block *e*, which rests on the beam A.

F F represent two metal wings or mold-boards, one being fastened to each side of the standard J. The wings or mold-boards F F extend beyond the rear end of the plow-beam, and rest against the cross-piece G, into which the plow-beam is mortised.

*i i* designate two knives, secured at one end to the sides of the wings or mold-boards F F, and fastened at their opposite ends to cross-beam A, by means of adjustable bolts or clips *b b*, said beam being furnished with holes for that purpose, and by means of this arrangement the knives *i i* can be placed in the required position, and the wings or mold-boards F F thrown in or out, so as to cut a ditch of any desired width, as shown in dotted lines, Figs. 2 and 3.

*m m* and *n n* represent straps for holding the wings F F in position, the straps *m m* confining the ends of said wings to cross-piece G, and the straps *n n* confining the center of the wings or mold-boards to cross-bar B. The wings or mold-boards F F occupy nearly a vertical position, and are made as shown in the drawings. The wings F F are supported at their lower ends by the shovel K, to which they are fastened, and near their upper ends rest on the iron bars, said bars being fastened to the lower side of cross-piece G by metal bands. The shovel is held firmly in position by an iron strip on each side, the upper ends of said strips being secured by staples to cross-bar B. The under side of the shovel or plow K is furnished with a concavity, or scooped out, as shown in dotted lines, Fig. 1. By means of this concavity in the shovel light draft is obtained, and the shovel also becomes sharper by wearing instead of growing dull, as the case would be if it were otherwise.

T represents a small platform, which is made adjustable by being hinged at one end to beam A, while the opposite end may be raised or lowered by the screw *h*. The platform T will be held in the required position by means of the springs *t*. The object of this platform is to regulate the depth of the plow in the soil.

To the bottom of platform T is secured, in a vertical position, the knife P, for the purpose of cutting roots near the surface of the ground.

*f* designates the colter, which is made circular in form and placed in front of the standard J, for the purpose of cutting roots.

It will also be observed that by the shape of this colter the machine will be prevented from being clogged or choked up with dirt while in motion.

The object of the wheels C C is to facilitate the removing of my ditcher by reversing it, so that the wheels will rest on the ground.

What I claim as new, and desire to secure by Letters Patent, is—

1. The adjustable features of the mold-board and knives for cutting a wide or narrow ditch, substantially as described.

2. The peculiar construction of the shovel, as and for the purpose set forth.

3. The construction of the colter, as and for the purpose specified.

4. The hinged platform T, for regulating the depth of the furrow or ditch, substantially as described.

5. In combination with the above, I claim screw *h* and springs *t*, substantially as set forth.

6. I claim axle B, wheels C C, beam A, platform T, screw *h*, springs *t*, and vertical knife P, all combined and arranged as and for the purpose set forth.

In testimony that I claim the foregoing as my own I affix my signature in presence of two witnesses.

DAVID WHISLER.

Witnesses:

E. A. BALLARD,

A. C. CRAWFORD.